US012741207B2

(12) United States Patent
Chen

(10) Patent No.: US 12,741,207 B2
(45) Date of Patent: Sep. 22, 2026

(54) DYNAMIC ENCODING PARAMETERS FOR LOW LATENCY STREAMING

(71) Applicant: Sony Interactive Entertainment Inc., Tokyo (JP)

(72) Inventor: Eric Chen, Saratoga, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 235 days.

(21) Appl. No.: 18/089,529

(22) Filed: Dec. 27, 2022

(65) Prior Publication Data

US 2024/0207731 A1 Jun. 27, 2024

(51) Int. Cl.

| | |
|---|---|
| ***A63F 13/358*** | (2014.01) |
| ***A63F 13/355*** | (2014.01) |
| ***H04N 19/146*** | (2014.01) |
| ***H04N 21/2187*** | (2011.01) |
| ***H04N 21/478*** | (2011.01) |

(52) U.S. Cl.

CPC .......... *A63F 13/358* (2014.09); *A63F 13/355* (2014.09); *H04N 19/146* (2014.11); *H04N 21/2187* (2013.01); *H04N 21/4781* (2013.01); *A63F 2300/534* (2013.01); *A63F 2300/538* (2013.01)

(58) Field of Classification Search

CPC ...... A63F 13/335; A63F 13/355; A63F 13/67; A63F 2300/6027; A63F 13/34; A63F 13/86; A63F 2300/538

See application file for complete search history.

(56) References Cited

U.S. PATENT DOCUMENTS

| | | | | |
|---|---|---|---|---|
| 10,951,890 | B1 * | 3/2021 | Dickson | H04L 65/1069 |
| 2020/0396501 | A1 * | 12/2020 | Lapicque | H04N 21/434 |
| 2021/0252402 | A1 | 8/2021 | Mishra | |
| 2023/0048189 | A1 * | 2/2023 | Boddeti | H04N 21/23439 |
| 2023/0415034 | A1 | 12/2023 | Mishra | |

FOREIGN PATENT DOCUMENTS

| | | | | |
|---|---|---|---|---|
| WO | WO-2021162831 | A1 * | 8/2021 | A63F 13/335 |

OTHER PUBLICATIONS

PCT/US2023/085350 Notification of Transmittal of the International Search Report and the Written Opinion of the International Searching Authority, or the Declaration, PCT/ISA/220, and the International Search Report, PCT/ISA/210, Apr. 11, 2024.

(Continued)

*Primary Examiner* — Ankit B Doshi

(74) *Attorney, Agent, or Firm* — Kilpatrick Townsend & Stockton LLP

(57) ABSTRACT

A method implemented in a cloud gaming system having at least one server computer is provided, including the following operations: executing a game session of a video game, wherein the execution of the game session renders gameplay video and generates game state data; using a machine learning (ML) model to determine encoding parameter settings based on the game state data; applying, by an encoder, the encoding parameter settings for processing of the gameplay video to generate compressed gameplay video; streaming the compressed gameplay video over a network to a client device.

20 Claims, 6 Drawing Sheets

(56) References Cited

OTHER PUBLICATIONS

Mossad Omar et al., "DeepGame Efficient Video Encoding for Cloud Gaming", Proc .of the 45th Intl ACM SIGIR Conf. on Research and Dev. in Information Retrieval, New York, NY, USA, Oct. 17, 2021, pp. 1387-1395, XP059240249, DOI: 10.1145/3474085.3475594, ISBN: 978-1-4503-8732-3.
Chen Hao et al., "T-Gaming: A Cost-Efficient Cloud Gaming System at Scale", IEEE Transactions on Parallel and Distributed Systems, IEEE, USA, vol. 30, No. 12, Dec. 1, 2019, pp. 2849-2865, XP011755425, ISSN: 1045-9219, DOI: 10.1109/TPDS.2019.2922205.

* cited by examiner

DYNAMIC ENCODING PARAMETERS FOR LOW LATENCY STREAMING

BACKGROUND

1. Field of the Disclosure

The present disclosure relates generally to methods, systems and devices for dynamic encoding parameters for low latency streaming.

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

It is in this context that implementations of the disclosure arise.

SUMMARY

Implementations of the present disclosure include methods, systems and devices for dynamic encoding parameters for low latency streaming in cloud gaming.

In some implementations, a method implemented in a cloud gaming system having at least one server computer is provided, including the following operations: executing a game session of a video game, wherein the execution of the game session renders gameplay video and generates game state data; using a machine learning (ML) model to determine encoding parameter settings based on the game state data; applying, by an encoder, the encoding parameter settings for processing of the gameplay video to generate compressed gameplay video; streaming the compressed gameplay video over a network to a client device.

In some implementations, the game state data identifies a current progress location of interactive gameplay of the video game.

In some implementations, the current progress location of the interactive gameplay is defined by a current section, scene, level, or campaign progress amount of the video game.

In some implementations, the game state data identifies a current position of a player avatar in an interactive environment defined by the execution of the game session of the video game.

In some implementations, the game state data identifies an access location, by the game session, of a game data file of the video game.

In some implementations, the encoding parameter settings include a peak bitrate setting for the encoder.

In some implementations, the ML model is trained using data from historical gameplays of the video game by a plurality of users.

In some implementations, the encoder applies a video codec that is one of H.264, H.265, H.266, AV1, or VP9.

In some implementations, non-transitory computer-readable medium having program instructions embodied thereon is provided, the program instructions being configured, when executed by at least one server computer of a cloud gaming system, to cause said at least one server computer to perform a method including the following operations: executing a game session of a video game, wherein the execution of the game session renders gameplay video and generates game state data; using a machine learning (ML) model to determine encoding parameter settings based on the game state data; applying, by an encoder, the encoding parameter settings for processing of the gameplay video to generate compressed gameplay video; streaming the compressed gameplay video over a network to a client device.

In some implementations, a cloud gaming system having at least one server computer is provided, said at least one server computer configured to perform a method including the following operations: executing a game session of a video game, wherein the execution of the game session renders gameplay video and generates game state data; using a machine learning (ML) model to determine encoding parameter settings based on the game state data; applying, by an encoder, the encoding parameter settings for processing of the gameplay video to generate compressed gameplay video; streaming the compressed gameplay video over a network to a client device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems and devices for dynamic encoding parameters for low latency streaming in cloud gaming.

Cloud gaming suffers from limited networking bandwidth. In cloud gaming, the video game is executed in the cloud, and the rendered video is passed to an encoder, which encodes or compresses the video for streaming over the Internet to a client device. However, the encoder, without additional information, cannot optimize its settings for different kinds of content with only one algorithm. Accordingly, implementations of the present disclosure utilize machine learning to apply differential encoding parameters to the encoder. When applied for multiple encoders, the differential encoding parameters enable a cloud resource to better balance the encoding needs of multiple client streams to provide efficient usage of network bandwidth while optimizing video stream quality for each client. Additionally, extralevel information from an in-game movie playout instance is provided. The extralevel information is utilized to further refine the encoding parameters within a given game title.

Figure 1:
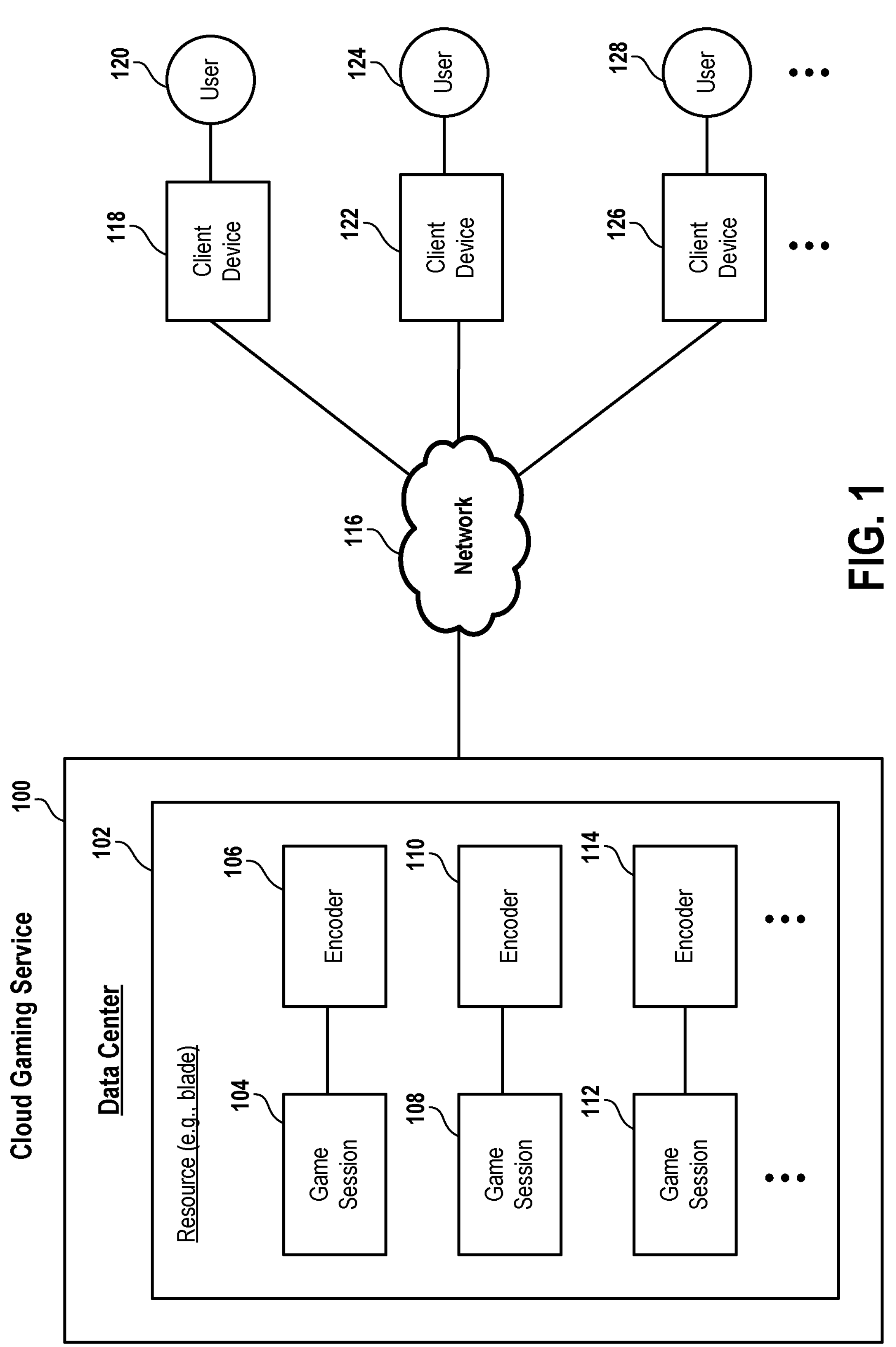
FIG. 1 conceptually illustrates a system for providing cloud gaming services to a plurality of users, in accordance with implementations of the disclosure.

FIG. 1 conceptually illustrates a system for providing cloud gaming services to a plurality of users, in accordance with implementations of the disclosure.

Broadly speaking, cloud gaming is a type of gaming wherein the video game itself is executed by a remote server, and the gameplay video is streamed over the Internet to the user's client device. Inputs generated from interactive gameplay are passed back over the Internet from the client device to the remote server to be applied by the executing game session. As video games can be resource intensive to execute, cloud gaming frees the user from being required to have a device with sufficient resources in order to execute the video game. However, the shift in execution to the cloud is dependent upon network bandwidth levels being sufficient to service a plurality of clients. A given cloud gaming service is constrained by its available bandwidth for streaming video to its clients, and further may be constrained in terms of available compute resources for handling game execution and video encoding.

In the illustrated implementation, a cloud gaming service is implemented in at least one data center 100. One example of a cloud gaming service is the PlayStation® Now or PlayStation® Plus service. The data center 100 includes at least one resource 102 configured for execution of a video game and a corresponding encoder. Broadly speaking, resource 102 can include hardware (e.g. one or more processors and memory/storage) and software (e.g. operating environment software) to enable the execution of one or more video games and corresponding one or more encoders. In various implementations, resource 102 is defined by a server blade or other computing device, which may be referred to as a cloud game machine.

The resource 102 may execute a plurality of game sessions for a plurality of respective users, such as game sessions 104, 108, and 112 for the users 120, 124, and 128, respectively. It will be appreciated that each game session is an executing instance of a video game, which can be the same or different video game titles for each of the users. The execution of game session 104 renders gameplay video that is passed to an encoder 106, which encodes the video from streaming over network 116 (e.g. including the Internet) to client device 118 for user 120. By way of example without limitation, client device 118 can be a personal computer, game console, laptop, tablet, cellular phone, mobile device, set-top box, streaming box/device/stick, etc. The client device 118 receives and processes the encoded video for presentation on a display for viewing by the user 120. The display may be connected to, or included in, the client device 118.

In a similar manner to game session 104, game session 108 generates video that is encoded by an encoder 110, and the encoded video is transmitted over network 116 to client device 122 for presentation on a corresponding display for viewing by user 124. And game session 112 generates video that is encoded by an encoder 114, and the encoded video is transmitted over network 116 to client device 126 for presentation on a corresponding display for viewing by user 128. It will be appreciated that game sessions 104, 108, and 112 and corresponding elements are shown by way of example, and that there may be additional game sessions and corresponding elements in various implementations. In some implementations, the resource 102 may support a maximum number of users (or players).

For the game sessions executed by the resource 102, there is a limited amount of bandwidth and/or compute resource available. Therefore, to provide a fair allocation of bandwidth to the video streams for each user of the resource 102, one technique is to simply allocate the same amount (or budget) of bandwidth or compute resource to each of the game sessions 104, 108, and 112. However, such an allocation does not optimize the use of bandwidth or resources across the game sessions as a whole, because at any given time, some game sessions may not actually require the full use of their allocated bandwidth/resource, in order to maintain a given video quality level or gaming experience, while other game sessions do or may even require more than their allocated bandwidth/resource in order to maintain the given video quality level. For example, some game sessions might only be involved in accessing game menus or low intensity scenes that require relatively low bandwidth, while other game sessions might be involved in high intensity scenes that require relatively high bandwidth. Accordingly, an allocation that simply allocates the same bandwidth for all sessions is not optimized. In view of this, implementations of the present disclosure provide systems and methods that enable optimized encoding of multiple game sessions so that bandwidth usage is optimized across the multiple game sessions, enabling more or less bandwidth usage that is tailored to each individual session based on the session's needs, so that when less bandwidth is required by one session and given thereto, then available additional bandwidth can be given to another session that requires more bandwidth.

Figure 2:
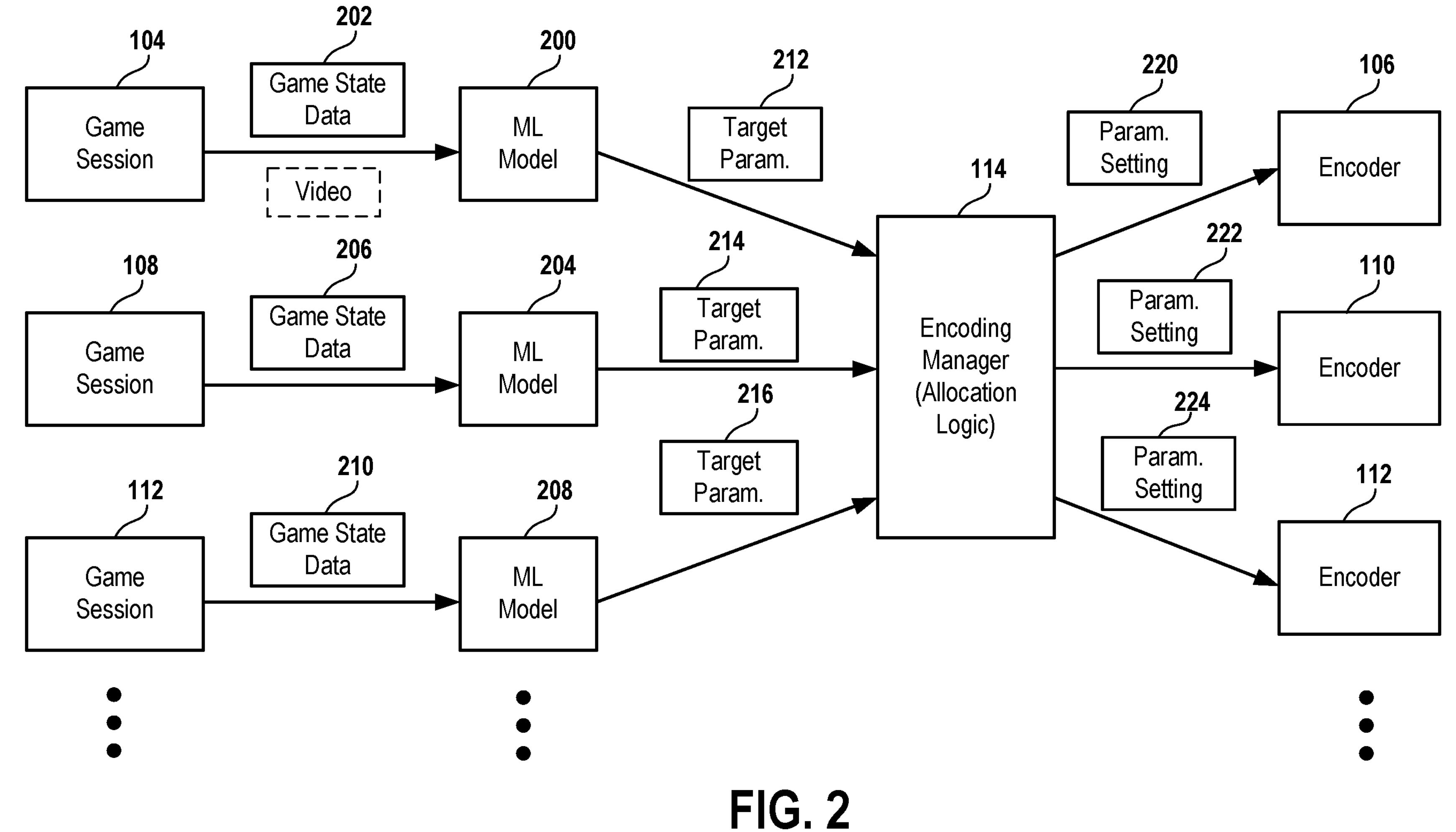
FIG. 2 conceptually illustrates a system and process for enabling optimized encoding parameter settings for cloud gaming, in accordance with implementations of the disclosure.

FIG. 2 conceptually illustrates a system and process for enabling optimized encoding parameter settings for cloud gaming, in accordance with implementations of the disclosure.

In the illustrated implementation, the game sessions 104, 108, and 112 as described above are shown. As previously described the game sessions 104, 108, and 112 in some implementations are executed on a shared resource, such as a server blade, with the shared resource having a limited bandwidth that defines the total bandwidth available for streaming of the gameplay videos from the game sessions. In order to optimize encoding across all the encoders, 106, 110, and 112, machine learning (ML) models are employed to determine optimized encoding parameter settings. More specifically in the illustrated implementation, a ML model 200 receives game state data 202 generated by the game session 104, and the ML model 200 processes the game state data 202 to generate target encoding parameter settings 212. Similarly, ML model 204 receives game state data 206 generated by game session 108, and the ML model 204 processes the game state data 206 to generate target encoding parameter settings 214; ML model 208 receives game state data 210 generated by game session 112, and the ML model 208 processes the game state data 210 to generate target encoding parameter settings 216.

For a given game session, the game state data can include data describing one or more of the following: the current progress or location of gameplay (e.g. current section, chapter, portion, scene, position in virtual environment, campaign progress location, gameplay timeline location, etc.), characteristics of virtual objects/characters (e.g. locations, movements, trajectories, visual properties, proximity to player location, etc.), player location/movement, player view direction or field of view, current status of gameplay or game access (e.g. accessing game menus, actively engaged in real-time gameplay, etc.), game file (e.g. data file) access locations, etc.

For the given game session, the ML model analyzes the game state data to generate target encoding parameter settings for the gameplay video generated by the game session. It will be appreciated that the ML model is configured and trained to determine the target encoding parameter settings for the particular video game title that is being executed in the game session. Broadly speaking, the target encoding parameter settings define the ideal parameters settings for the corresponding encoder for the game session (e.g. encoder 106 for game session 104), given the current state of the executing game session as reflected in the game state data. Thus, for example, if the game session is currently involved in a lower intensity scene (e.g. less complex scene, lower amount of virtual objects rendered, less movement/action, etc.), then the target encoding parameter settings will generally be configured to be lower fidelity so that the gameplay video is encoded at lower fidelity settings; whereas if the game session is currently involved in a higher intensity scene (e.g. more complex scene, higher amount of virtual objects rendered, more movement/action, etc.), then the target encoding parameter settings will generally be configured to be higher fidelity so that the gameplay video is encoded at higher fidelity settings.

It will be appreciated that the target encoding parameter settings generated by the ML model can be predictive in nature. That is, the ML model is configured and trained to determine the ideal encoding parameter settings based on the game session's current state, and such ideal encoding parameter settings can be optimized in view of predicted future game states. In some implementations, the ML model is trained to predict the target encoding parameter settings for future game states. In some implementations, the ML model is configured to generate target encoding parameter settings covering a range of time points, such as including current and future time points. Thus, for example, the ML model might recognize based on the current game state data that the player is approaching a complex scene (e.g. a high intensity boss fight), and therefore the ML model will predict that higher target bitrates will be needed in the near future. Accordingly, the ML model will generate higher target bitrates, which can be applied so that the encoder can be set to a higher bitrate in advance of the player reaching the complex scene and the encoder is thus ready in advance to handle encoding of the complex scene so that there will be no drop-off in streaming quality for the player upon reaching the complex scene. In this manner, the encoder settings can be predictively set based on the application of the ML model to the game state data.

It will be appreciated that encoding parameters are specific to a given video codec used by the encoder. Some examples of encoding codecs include H.264, H.265, H.266, AV1, VP9, etc. Examples of encoding parameters can include one or more of the following: bitrate (e.g. peak bitrate), resolution, compression level, quantizer-curve compression, motion estimation search pattern/range, sub-pixel motion-vector refinement, number of reference frames, rate-distortion optimization, psycho-visual optimization, DCT-based decimation, frame partitions, deblocking, etc.

As described with continued reference to FIG. 2, each of ML models 200, 204, and 208, generates target encoding parameter settings 212, 214, and 216, respectively. In some implementations, the target encoding parameter settings generated by the ML models are applied by their respective encoders (encoders 106, 110, and 112 in the illustrated implementation). As applied across many game session instances and encoders, then the application of the target encoding parameter settings by the encoders enables more efficient bandwidth/resource usage, as settings such as bitrate are adjusted up and down according to the needs of individual game sessions.

However, in some implementations, it may be the case that the idealized target encoding parameter settings 212, 214, and 216, if applied in combination to their respective encoders, may consume a total bandwidth/resource amount that exceeds the capability or total allowed for the combined game sessions (e.g. total allowed for the resource 102 on which the game sessions execute). Therefore, in some implementations, an encoding manager 218 is provided to determine the final encoding parameter settings for each of the encoders, based on the target encoding parameter settings, so that total consumption of bandwidth/resource does not exceed a maximum amount. In the illustrated implementation, the encoding manager considers the target encoding parameter settings 212, 214, and 216, and adjusts them if necessary, to generate the final encoding parameter settings 220, 222, and 224, respectively, which are passed to the encoders 106, 110, and 112 to perform video encoding accordingly.

In some implementations, the encoding manager 218 may or may not implement target parameter settings depending upon the current bandwidth usage of the game sessions as a whole. For example, a target bitrate setting that represents a reduction from the game session's current bitrate setting might not be implemented by the encoding manager 218 if it is not necessary to accommodate other target bitrate settings, e.g. so that if the target bitrate setting eventually returns to a higher bitrate setting, then the bitrate setting need not be adjusted again. Or in some implementations, a target bitrate setting that represents a reduction from the game session's current bitrate setting might be implemented by the encoding manager 218 even if it is not necessary to accommodate other target bitrate settings, e.g. so that additional bandwidth is already available when other sessions increase their target bitrate settings.

In another implementation, a game session can itself be configured to provide the target encoding parameter settings. For example, the gaming platform can provide a side-channel for communicating target encoding parameter settings, and video game can be developed to utilize the side-channel to communicate target encoding parameter settings determined (and/or preferred) by the video game itself based on any of the factors described above, such as game progress, virtual object characteristics, etc.

By implementing a process as presently described, the encoders 106, 110, and 112 are continually and dynamically adjusting their parameter settings based on the current and predicted states of the game sessions. Further, bandwidth/resource usage can be allocated in an optimal manner overall, by enabling sessions requiring more bandwidth to be allocated more bandwidth than sessions requiring less bandwidth. This more efficiently utilizes bandwidth to provide a higher quality gaming experience to each individual user.

Figure 3:
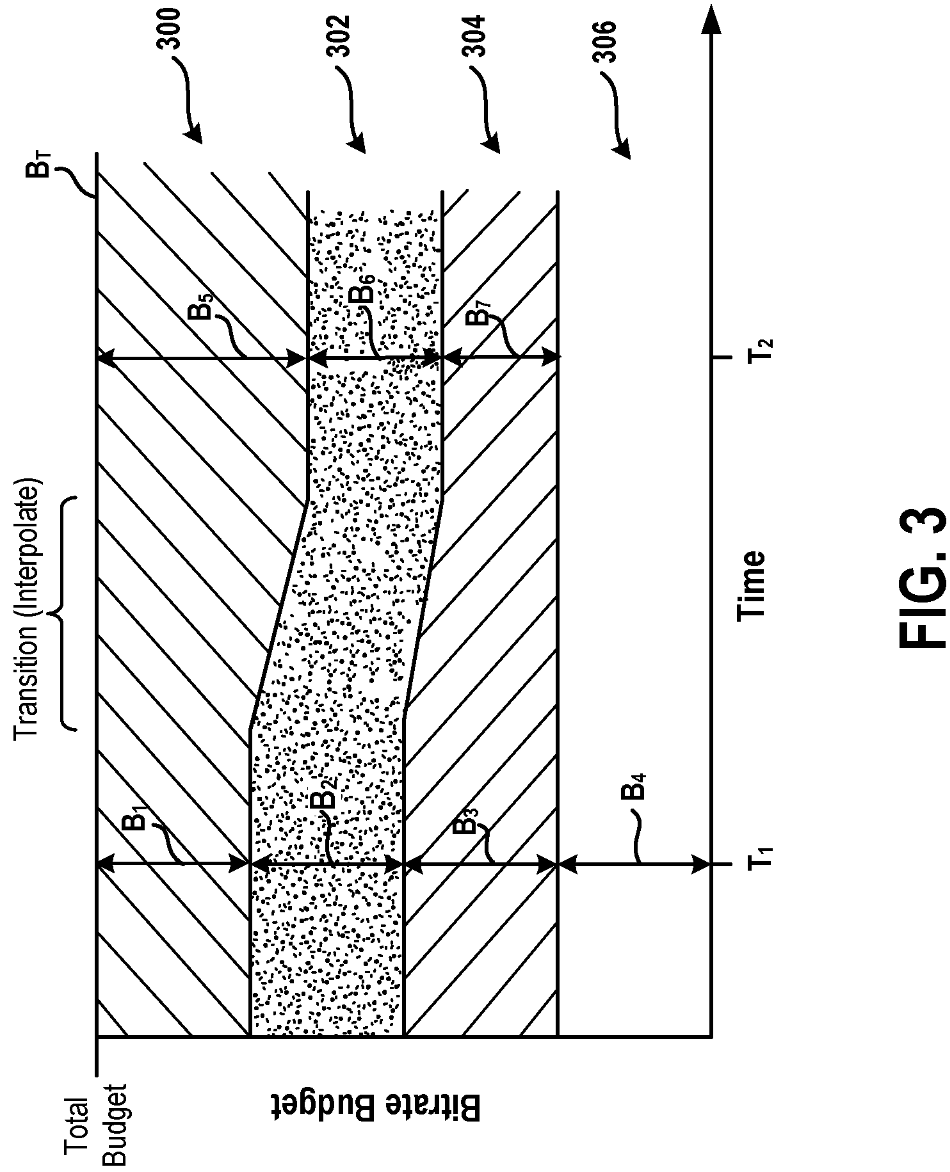
FIG. 3 is a graph conceptually illustrating dynamically changing bitrate budgets for a plurality of game sessions, in accordance with implementations of the disclosure.

FIG. 3 is a graph conceptually illustrating dynamically changing bitrate budgets for a plurality of game sessions, in accordance with implementations of the disclosure.

In the illustrated graph, bitrate budget versus time is shown. A total bitrate budget is defined by the line $B_T$, which may be the total bitrate allowed under the maximum bandwidth defined for the resource on which the game sessions execute. The various shaded regions 300, 302, 304, and 306 represent the bitrate budgets over time of video streams for first, second, third, and fourth video game sessions, respectively.

As shown, at time $T_1$, the bitrate budget (or peak bitrate) for a first video game session is $B_1$; the bitrate budget for a second video game session is $B_2$; the bitrate budget for a third video game session is $B_3$; the bitrate budget for a fourth video game session is $B_4$. At time $T_2$, the bitrate budget for the first video game session has increased to $B_5$, whereas the bitrate budgets for the second and third video game sessions have decreased to $B_6$ and $B_7$ respectively. The bitrate budget for the fourth video game session has remained the same from time $T_1$ to $T_2$. It will be appreciated that more bitrate budget has been allocated to the first video game session while the bitrate budgets for the second and third video game sessions have been reduced, and that this has been accomplished while maintaining the same overall total bitrate budget $B_T$. The bitrate budgets of the game sessions are variable over time, in accordance with implementations described herein, and dynamically adjusted to prioritize different video game sessions as needed, so as to optimize the usage of the total bitrate budget available to provide the highest quality gaming experience possible to all of the players simultaneously within the total bitrate budget.

In some implementations, transitions from one bitrate budget to another bitrate budget can be interpolated, e.g. by the encoding manager 218 described above, such as by ramping the bitrate budget of a given game session from one level to another. By way of example in the illustrated implementation, the bitrate budget of the first game session as shown by region 300, ramps from the bitrate $B_1$ to $B_5$. In some implementations, the bitrate $B_5$ may be a target bitrate generated by an ML model, and the encoding manager interpolates changes in the bitrate from the existing bitrate $B_1$ to the target bitrate $B_5$.

Figure 4:
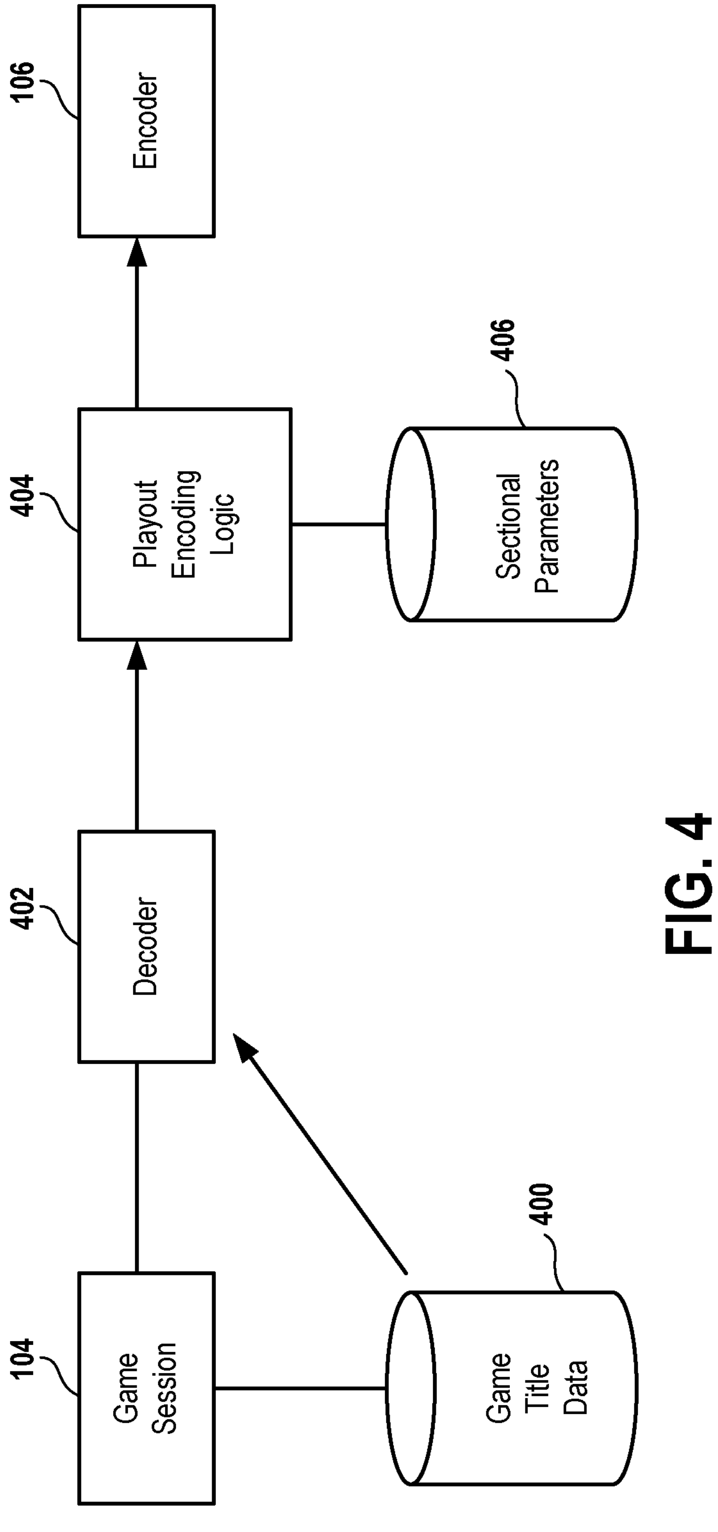
FIG. 4 conceptually illustrates a system for providing optimized encoding of game video for an in-game movie or cut-scene, in accordance with implementations of the disclosure.

FIG. 4 conceptually illustrates a system for providing optimized encoding of game video for an in-game movie or cut-scene, in accordance with implementations of the disclosure.

It will be appreciated that in some instances, when a user is playing a video game, the video game is actually playing a pre-recorded video, such as an in-game movie, cut-scene, tutorial, or other predefined video that is played back during the course of the game. Accordingly, as such a video is pre-defined, optimized encoding parameters for the pre-defined video can be determined in advance and utilized to provide optimized encoding of the video in the context of cloud game streaming.

In the illustrated implementation, the game session 104 accesses game title data 400 for a given video game title. When the game session 104 reaches a point in the game where a predefined video is shown, the game session 104 activates (or calls, initiates, triggers, etc.) a decoder 402 to decode the video data for the predefined video, the video data (e.g. one or more video files) being part of the game title data 400. The decoded video is encoded (e.g. compressed) by the encoder 106 for streaming to the user's client device. In some implementations, the decoder 402 is a standardized component or library of a game execution environment, such as a console game execution environment, and the activation of the decoder 402 by the game session 104 can be detected by the system.

When the decoder 402 is activated, then playout encoding logic 404 is configured to access sectional parameters 406 which define corresponding target encoding settings for the predefined video playout. Such target encoding settings can be defined for various time points during the predefined video playout, and the playout encoding logic 404 is configured to synchronize the target encoding settings to the playout by the decoder 402 (e.g. synchronized to time codes in the predefined video data) to provide the correct target encoding settings to the encoder 106 at the appropriate time during video playback for the encoding of the decoded video by the encoder 106. In some implementations, the sectional parameters are provided to the encoder 106. Whereas in other implementations the sectional parameters are provided to the encoding manager 218 previously described, which may further adjust the parameters as needed in accordance with the above, such as to ensure that the total bandwidth limit of a shared resource is not exceeded.

Figure 5:
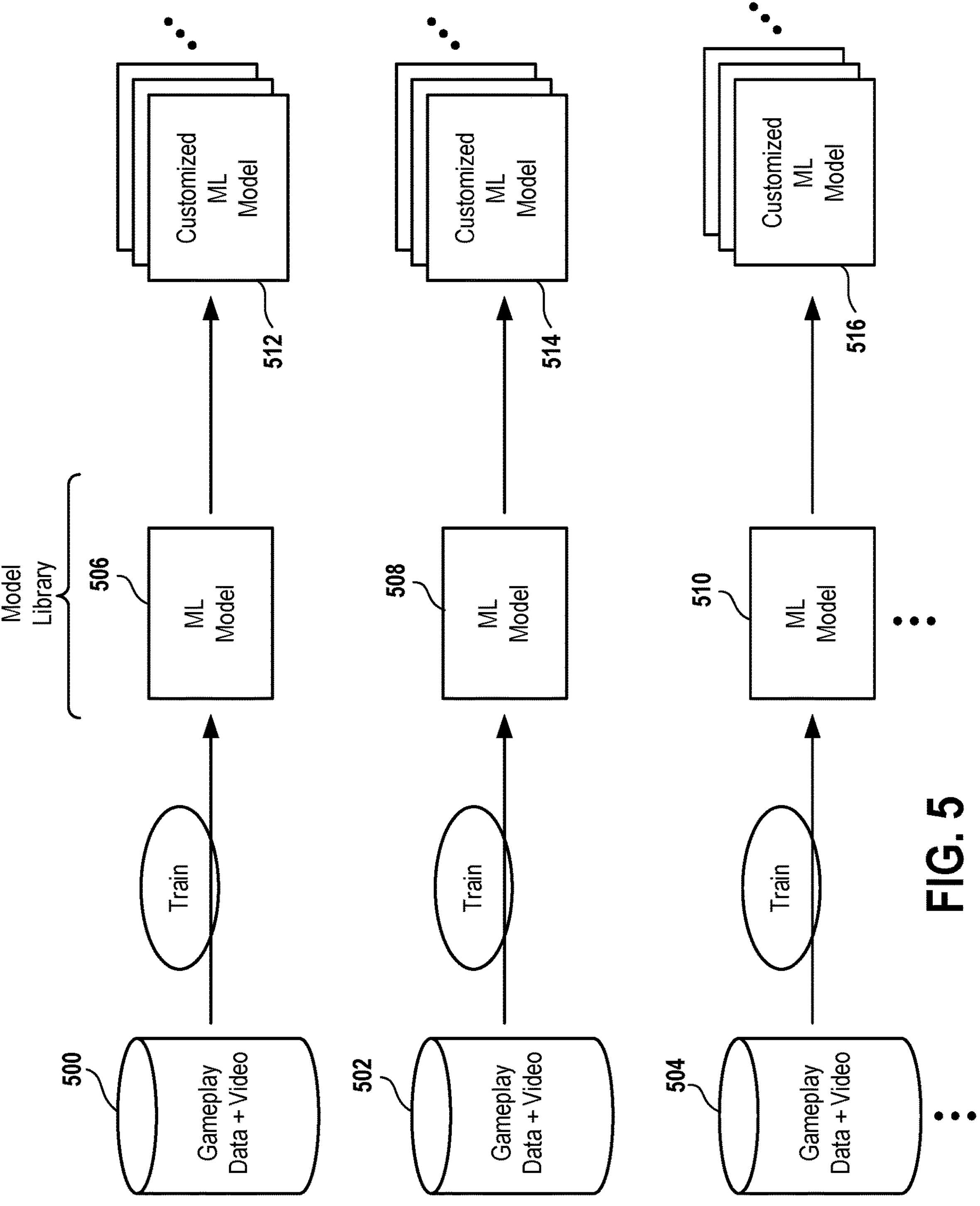
FIG. 5 conceptually illustrates a process for training machine learning models for determining target encoding parameter settings for cloud video games, in accordance with implementations of the disclosure.

FIG. 5 conceptually illustrates a process for training machine learning models for determining target encoding parameter settings for cloud video games, in accordance with implementations of the disclosure.

In order to generate appropriate ML models for various video games, gameplay data and gameplay video from previous gameplays of the video games are collected. For example, in the illustrated implementation, gameplay data and video 500 from previous gameplays of a first video game by various users of the system are recorded and stored. Similarly, gameplay data and video 502 from previous gameplays of a second video game by various users of the system are recorded and stored; and, gameplay data and video 504 from previous gameplays of a third video game by various users of the system are recorded and stored. It will be appreciated that the gameplay data can include any of the above-described game state data.

The gameplay data and gameplay video 500 are used to train the ML model 506. For example, the gameplay video can be analyzed to determine the optimal encoding parameter settings for the gameplay video, and the corresponding gameplay data and the optimal encoding parameter settings can be used to train the ML model 506 to determine or predict optimal encoding parameter settings based on received game state data for the first video game. In a similar manner, the gameplay data and video 502 can be used to train the ML model 508 for the second video game; and the gameplay data and video 504 can be used to train the ML model 510 for the third video game. Accordingly, the various ML models 506, 508, and 510, etc. correspond to specific video games and are configured to determine/predict target encoding parameter settings for their respective video games. The trained ML models can be stored to a model library that is accessed on demand by the systems of the present disclosure.

The trained ML models 506, 508, 510, etc. can define initial ML models for use for their respective video games. In some implementations, as a given user plays the first video game over time, the ML model 506 can be further refined and customized through feedback provided by the user's specific gameplay data and video, and thus a customized ML model 512 for the given user (for the first video game) can be developed and refined over time based on the user's gameplay. For example, the gameplay video generated from the specific user's gameplay can be processed to determine optimal encoding parameter settings, and these along with the corresponding game state data can be used to further train the customized ML model 512 for the specific user. It will be appreciated that various users that play the first video game can similarly have ML models that are customized based on their gameplay.

In a similar manner, for a given player of the second video game, the ML model 508 can be used as an initial starting point, and further refined based on the given player's gameplay to develop a customized ML model 514 for the specific player based on the player's gameplay of the second video game. Likewise, for a given player of the third video game, the ML model 510 can be used as an initial starting point, and further refined based on the given player's gameplay to develop a customized ML model 516 for the specific player based on the player's gameplay of the third video game.

Figure 6:
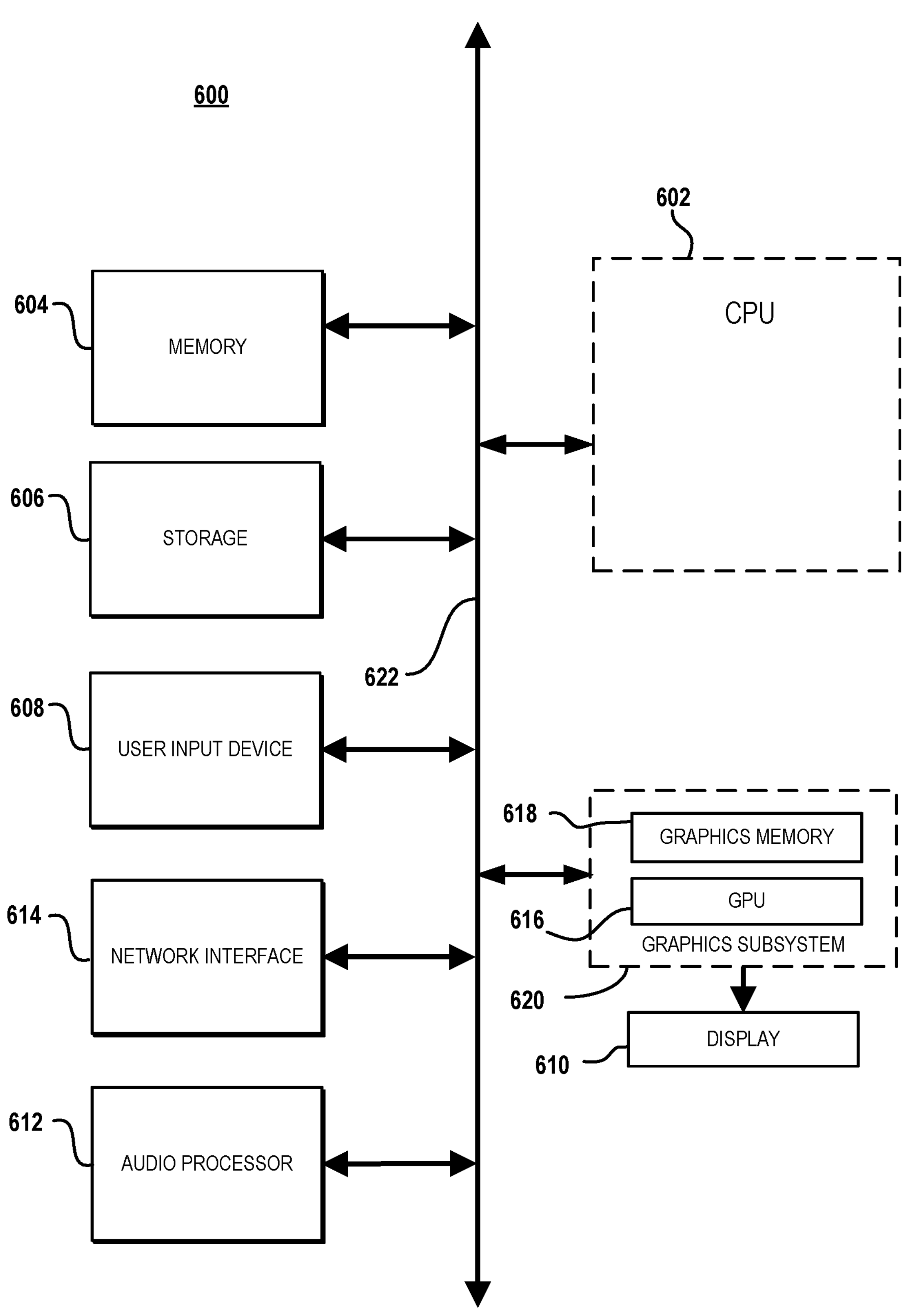
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

executing a game session of a video game, wherein the execution of the game session renders gameplay video and generates game state data;

providing the game state data as input to a machine learning (ML) model;

predicting, using the machine learning (ML) model, a future in-game scene complexity based on the game state data;

identifying, based on the game state data, a game interval associated with the future in-game scene complexity;

determining, using the machine learning (ML) model, encoding parameter settings based on the future in-game scene complexity, wherein the encoding parameter settings correspond to the game interval;

applying, by an encoder, the encoding parameter settings for processing of the gameplay video to generate compressed gameplay video corresponding to the game interval; and streaming the compressed gameplay video over a network to a client device.

2. The method of claim 1, wherein the game state data identifies a current progress location of interactive gameplay of the video game.

3. The method of claim 2, wherein the current progress location of the interactive gameplay is defined by a current section, scene, level, or campaign progress amount of the video game.

4. The method of claim 2, wherein the game state data identifies a current position of a player avatar in an interactive environment defined by the execution of the game session of the video game.

5. The method of claim 1, wherein the game state data identifies an access location, by the game session, of a game data file of the video game.

6. The method of claim 1, wherein the encoding parameter settings include a peak bitrate setting for the encoder.

7. The method of claim 1, wherein the ML model is trained using data from historical gameplays of the video game by a plurality of users.

8. The method of claim 1, wherein the encoder applies a video codec that is one of H.264, H.265, H.266, AV1, or VP9.

9. The method of claim 1, further comprising:

training the machine learning (ML) model using historical game state data and encoding parameters settings generated from prior game sessions associated with a plurality of users.

10. One or more non-transitory computer-readable media storing computer-readable instructions that, when executed by one or more processors, to cause a system to perform operations comprising:

executing a game session of a video game, wherein the execution of the game session renders gameplay video and generates game state data;

providing the game state data as input to a machine learning (ML) model;

predicting, using the machine learning (ML) model, a future in-game scene complexity based on the game state data;

identifying, based on the game state data, a game interval associated with the future in-game scene complexity;

determining, using the machine learning (ML) model, encoding parameter settings based on the future in-game scene complexity, wherein the encoding parameter settings correspond to the game interval;

applying, by an encoder, the encoding parameter settings for processing of the gameplay video to generate compressed gameplay video corresponding to the game interval; and streaming the compressed gameplay video over a network to a client device.

11. The one or more non-transitory computer-readable media of claim 10, wherein the game state data identifies a current progress location of interactive gameplay of the video game.

12. The one or more non-transitory computer-readable media of claim 11, wherein the current progress location of the interactive gameplay is defined by a current section, scene, level, or campaign progress amount of the video game.

13. The one or more non-transitory computer-readable media of claim 11, wherein the game state data identifies a current position of a player avatar in an interactive environment defined by the execution of the game session of the video game.

14. The one or more non-transitory computer-readable media of claim 10, wherein the game state data identifies an access location, by the game session, of a game data file of the video game.

15. The one or more non-transitory computer-readable media of claim 10, wherein the encoding parameter settings include a peak bitrate setting for the encoder.

16. The one or more non-transitory computer-readable media of claim 10, wherein the ML model is trained using data from historical gameplays of the video game by a plurality of users.

17. A system comprising:

a processing system; and a memory configured to store computer-executable instructions; and a processor configured to access the memory and execute the computer-executable instructions to at least:

execute a game session of a video game, wherein the execution of the game session renders gameplay video and generates game state data;

provide the game state data as input to a machine learning (ML) model;

predict, using the machine learning (ML) model, a future in-game scene complexity based on the game state data;

identify, based on the game state data, a game interval associated with the future in-game scene complexity; p2 determine, using the machine learning (ML) model, encoding parameter settings based on the future in-game scene complexity, wherein the encoding parameter settings correspond to the game interval;

apply, by an encoder, the encoding parameter settings for processing of the gameplay video to generate compressed gameplay video corresponding to the game interval; and stream the compressed gameplay video over a network to a client device.

18. The system of claim 17, wherein the game state data identifies a current progress location of interactive gameplay of the video game.

19. The system of claim 18, wherein the current progress location of the interactive gameplay is defined by a current section, scene, level, or campaign progress amount of the video game.

20. The system of claim 18, wherein the game state data identifies a current position of a player avatar in an interactive environment defined by the execution of the game session of the video game.

* * * * *